(12) United States Patent
Heyes et al.

(10) Patent No.: US 12,475,997 B2
(45) Date of Patent: Nov. 18, 2025

(54) DIALYSIS CASSETTE WITH RFID CHIP

(71) Applicant: Quanta Dialysis Technologies Ltd.

(72) Inventors: Keith Heyes, Warwickshire (GB); Clive Henry Buckberry, Warwickshire (GB); Eduardo Esser, Warwickshire (GB); Alan Barlow, Warwickshire (GB)

(73) Assignee: QUANTA DIALYSIS TECHNOLOGIES LIMITED, Warwick (GB)

( * ) Notice: Subject to any disclaimer, the term of this patent is extended or adjusted under 35 U.S.C. 154(b) by 0 days.

(21) Appl. No.: 16/499,291

(22) PCT Filed: Mar. 27, 2018

(86) PCT No.: PCT/GB2018/050797
§ 371 (c)(1),
(2) Date: Sep. 29, 2019

(87) PCT Pub. No.: WO2018/178651
PCT Pub. Date: Oct. 4, 2018

(65) Prior Publication Data
US 2021/0110920 A1    Apr. 15, 2021

(30) Foreign Application Priority Data

Mar. 31, 2017  (GB) ...................... 1705273

(51) Int. Cl.
*G16H 40/40*    (2018.01)
*A61M 1/14*    (2006.01)
(Continued)

(52) U.S. Cl.
CPC .............. *G16H 40/40* (2018.01); *A61M 1/15* (2022.05); *A61M 1/152* (2022.05); *A61M 1/168* (2013.01);
(Continued)

(58) Field of Classification Search
CPC ....... G16H 40/40; G16H 20/10; A61M 1/168; A61M 2205/3553; A61M 2205/502;
(Continued)

(56) References Cited

U.S. PATENT DOCUMENTS 2,696,173 A    12/1954    Thormod et al.
3,338,171 A    8/1967    Conklin et al.
(Continued)

FOREIGN PATENT DOCUMENTS

CA    81430 S    8/1997
DE    10024447 A1    11/2001
(Continued)

OTHER PUBLICATIONS

International Search Report and Written Opinion for International Application No. PCT/GB2018/050797, date mailed Jun. 12, 2018.
(Continued)

*Primary Examiner* — Kabir A Timory
(74) *Attorney, Agent, or Firm* — The Marbury Law Group, PLLC

(57) ABSTRACT

A fluidic cartridge for use with a dialysis system, a method of manufacturing the fluidic cartridge, a dialysis machine and a method of operating the dialysis machine with the fluidic cartridge. The fluidic cartridge has a data storage unit, the data storage unit stores data relating to one or more physical properties of the cartridge. A cartridge for use in a portable dialysis machine and a portable dialysis machine. The cartridge has a data storage unit, the data storage unit stores data relating to sterilisation of the cartridge.

19 Claims, 4 Drawing Sheets

(51) Int. Cl.
*A61M 1/16* (2006.01)
*G16H 20/10* (2018.01)

(52) U.S. Cl.
CPC .............. *G16H 20/10* (2018.01); *A61M 1/154* (2022.05); *A61M 1/15625* (2022.05); *A61M 2205/3553* (2013.01); *A61M 2205/502* (2013.01); *A61M 2205/60* (2013.01); *A61M 2205/70* (2013.01)

(58) Field of Classification Search
CPC .......... A61M 2205/60; A61M 2205/70; A61M 2205/12; A61M 2205/3592; A61M 2205/6054; A61M 1/34; A61M 1/14; A61M 1/152; A61M 1/154; A61M 1/15625; A61M 2205/6036; A61M 1/15
See application file for complete search history.

(56) References Cited

U.S. PATENT DOCUMENTS

| | | |
|---|---|---|
| 3,468,261 A | 9/1969 | Schmierer et al. |
| 3,605,566 A | 9/1971 | Vetter et al. |
| 3,606,592 A | 9/1971 | Madurski et al. |
| 3,753,493 A | 8/1973 | Mellor |
| 3,774,762 A | 11/1973 | Lichtenstein |
| 3,807,906 A | 4/1974 | Breit |
| 3,921,622 A | 11/1975 | Cole |
| 3,972,320 A | 8/1976 | Kalman |
| 4,070,725 A | 1/1978 | Austin et al. |
| 4,142,845 A | 3/1979 | Lepp et al. |
| 4,161,264 A | 7/1979 | Malmgren |
| 4,205,686 A | 6/1980 | Harris et al. |
| 4,353,990 A | 10/1982 | Manske et al. |
| 4,366,061 A | 12/1982 | Papanek et al. |
| 4,368,261 A | 1/1983 | Klose et al. |
| 4,370,983 A | 2/1983 | Lichtenstein |
| 4,430,048 A | 2/1984 | Fritsch |
| 4,494,912 A | 1/1985 | Pauliukonis |
| D277,991 S | 3/1985 | Becker |
| 4,534,755 A | 8/1985 | Calvert et al. |
| 4,534,756 A | 8/1985 | Nelson |
| 4,546,669 A | 10/1985 | Fischer et al. |
| 4,564,342 A | 1/1986 | Weber et al. |
| 4,599,165 A | 7/1986 | Chevallet |
| 4,648,869 A | 3/1987 | Bobo, Jr. |
| 4,666,598 A | 5/1987 | Heath et al. |
| 4,710,163 A | 12/1987 | Butterfield |
| 4,771,792 A | 9/1988 | Seale |
| 4,828,543 A | 5/1989 | Weiss et al. |
| 4,897,184 A | 1/1990 | Shouldice et al. |
| D308,249 S | 5/1990 | Buckley |
| 4,969,991 A | 11/1990 | Valadez |
| 5,000,664 A | 3/1991 | Lawless et al. |
| 5,012,197 A | 4/1991 | Seiffert et al. |
| 5,032,265 A | 7/1991 | Jha et al. |
| 5,055,198 A | 10/1991 | Shettigar |
| 5,095,910 A | 3/1992 | Powers |
| 5,103,211 A | 4/1992 | Daoud et al. |
| 5,126,831 A | 6/1992 | Nakagawara |
| 5,232,434 A | 8/1993 | Inagaki et al. |
| 5,252,213 A | 10/1993 | Ahmad et al. |
| D341,890 S | 11/1993 | Sievert et al. |
| D344,339 S | 2/1994 | Yoshikawa et al. |
| 5,304,349 A | 4/1994 | Polaschegg |
| D347,896 S | 6/1994 | Dickinson et al. |
| D351,470 S | 10/1994 | Scherer et al. |
| 5,385,540 A | 1/1995 | Abbott et al. |
| 5,421,823 A | 6/1995 | Kamen et al. |
| 5,458,468 A | 10/1995 | Ye et al. |
| 5,476,368 A | 12/1995 | Rabenau et al. |
| 5,476,792 A | 12/1995 | Ezrielev et al. |
| D370,979 S | 6/1996 | Pascale et al. |
| 5,558,347 A | 9/1996 | Nicholson |
| 5,586,872 A | 12/1996 | Skobelev et al. |
| 5,586,873 A | 12/1996 | Novak et al. |
| 5,591,344 A | 1/1997 | Kenley et al. |
| 5,643,201 A | 7/1997 | Peabody et al. |
| 5,650,071 A | 7/1997 | Brugger et al. |
| 5,653,456 A | 8/1997 | Mough |
| 5,658,456 A | 8/1997 | Kenley et al. |
| 5,665,307 A | 9/1997 | Kirschner et al. |
| 5,727,550 A | 3/1998 | Montecalvo |
| D395,085 S | 6/1998 | Kenley et al. |
| 5,788,851 A | 8/1998 | Kenley et al. |
| 5,807,322 A | 9/1998 | Lindsey et al. |
| 5,882,300 A | 3/1999 | Malinouskas et al. |
| 5,948,247 A | 9/1999 | Gillerfalk et al. |
| 5,957,670 A | 9/1999 | Duncan et al. |
| 5,995,910 A | 11/1999 | Discenzo |
| 6,077,443 A | 6/2000 | Goldau |
| 6,126,831 A | 10/2000 | Goldau et al. |
| 6,132,378 A | 10/2000 | Marino |
| 6,143,181 A | 11/2000 | Falkvall et al. |
| 6,153,102 A | 11/2000 | Kenley et al. |
| 6,216,029 B1 | 4/2001 | Paltieli |
| 6,218,329 B1 | 4/2001 | Singh et al. |
| 6,251,279 B1 | 6/2001 | Peterson et al. |
| 6,261,065 B1 | 7/2001 | Nayak et al. |
| 6,303,036 B1 | 10/2001 | Collins et al. |
| 6,382,923 B1 | 5/2002 | Gray |
| 6,514,462 B1 | 2/2003 | Simons |
| 6,558,347 B1 | 5/2003 | Jhuboo et al. |
| 6,582,206 B2 | 6/2003 | Schluecker |
| 6,626,832 B1 | 9/2003 | Paltieli et al. |
| 6,626,878 B1 | 9/2003 | Leisner et al. |
| 6,645,176 B1 | 11/2003 | Christenson et al. |
| 6,663,829 B1 | 12/2003 | Kjellstrand |
| 6,733,476 B2 | 5/2004 | Christenson et al. |
| 6,743,204 B2 | 6/2004 | Christenson et al. |
| 6,801,646 B1 | 10/2004 | Pena et al. |
| 6,814,547 B2 | 11/2004 | Childers et al. |
| 6,967,002 B1 | 11/2005 | Edgson et al. |
| 7,040,142 B2 | 5/2006 | Burbank |
| 7,107,837 B2 | 9/2006 | Lauman et al. |
| 7,153,286 B2 | 12/2006 | Busby et al. |
| 7,220,358 B2 | 5/2007 | Schacht et al. |
| 7,284,964 B2 | 10/2007 | McDowell et al. |
| 7,434,312 B2 | 10/2008 | Christenson et al. |
| 7,494,590 B2 | 2/2009 | Felding et al. |
| 7,604,398 B1 | 10/2009 | Akers et al. |
| 7,648,627 B2 | 1/2010 | Beden et al. |
| 7,857,976 B2 | 12/2010 | Bissler et al. |
| 7,874,999 B2 | 1/2011 | Busby |
| 7,896,197 B2 | 3/2011 | Furey et al. |
| D641,882 S | 7/2011 | Hickey et al. |
| 8,114,043 B2 | 2/2012 | Muller |
| 8,132,388 B2 | 3/2012 | Nagy et al. |
| 8,137,184 B2 | 3/2012 | Ajiro et al. |
| 8,137,300 B2 | 3/2012 | Han et al. |
| 8,167,431 B2 | 5/2012 | DeCusatis et al. |
| 8,187,184 B2 | 5/2012 | Muller et al. |
| 8,192,388 B2 | 6/2012 | Hogard |
| 8,197,431 B2 | 6/2012 | Bennison |
| 8,221,320 B2 | 7/2012 | Bouton |
| 8,348,850 B2 | 1/2013 | Frinak et al. |
| 8,360,977 B2 | 1/2013 | Marttila et al. |
| 8,529,490 B2 | 9/2013 | Wariar et al. |
| 8,535,522 B2 | 9/2013 | Fulkerson et al. |
| 8,535,525 B2 | 9/2013 | Heyes et al. |
| D693,469 S | 11/2013 | Chung et al. |
| 8,597,505 B2 | 12/2013 | Fulkerson et al. |
| D702,842 S | 4/2014 | Hyde et al. |
| 8,685,244 B2 | 4/2014 | Heyes et al. |
| 8,696,571 B2 | 4/2014 | Marttila et al. |
| 8,708,908 B2 | 4/2014 | Bouton |
| 8,708,946 B2 | 4/2014 | Han et al. |
| D705,432 S | 5/2014 | Lura et al. |
| 8,798,908 B2 | 8/2014 | Bourdeaut |
| 8,801,646 B2 | 8/2014 | Han et al. |
| D714,454 S | 9/2014 | Amemiya et al. |
| D714,946 S | 10/2014 | Lura et al. |
| 8,926,544 B2 | 1/2015 | Hogard |
| D724,740 S | 3/2015 | Collins et al. |

(56) References Cited

U.S. PATENT DOCUMENTS

| | | | |
|---|---|---|---|
| 8,974,394 B2 | 3/2015 | Frinak et al. | |
| 9,011,334 B2 | 4/2015 | Bouton | |
| D735,868 S | 8/2015 | Mareguddi et al. | |
| 9,220,825 B2 | 12/2015 | Buckberry | |
| D781,410 S | 3/2017 | Ritter et al. | |
| 9,744,285 B2 | 8/2017 | Heyes et al. | |
| 9,833,553 B2 | 12/2017 | Higgitt et al. | |
| 10,456,516 B2 | 10/2019 | Heyes et al. | |
| D867,597 S | 11/2019 | Bauer et al. | |
| 10,543,305 B2 | 1/2020 | Buckberry et al. | |
| D879,967 S | 3/2020 | Verguldi et al. | |
| D907,211 S | 1/2021 | Spurling | |
| 10,881,775 B2 | 1/2021 | Wallace | |
| 10,960,120 B2 | 3/2021 | Wallace et al. | |
| D924,410 S | 7/2021 | Mendoza et al. | |
| D938,046 S | 12/2021 | Gupta et al. | |
| 11,365,728 B2 | 6/2022 | Westenbrink | |
| 2003/0217962 A1 | 11/2003 | Childers et al. | |
| 2004/0195157 A1 | 10/2004 | Mullins et al. | |
| 2004/0206703 A1 | 10/2004 | Bosetto et al. | |
| 2004/0215129 A1 | 10/2004 | Edgson et al. | |
| 2004/0223857 A1 | 11/2004 | Kline | |
| 2005/0020961 A1 | 1/2005 | Burbank et al. | |
| 2005/0131332 A1* | 6/2005 | Kelly | A61M 1/362265 604/4.01 |
| 2005/0205476 A1 | 9/2005 | Chevallet et al. | |
| 2005/0209547 A1 | 9/2005 | Burbank et al. | |
| 2005/0234384 A1 | 10/2005 | Westberg | |
| 2006/0121623 A1 | 6/2006 | He et al. | |
| 2007/0083193 A1 | 4/2007 | Werneth et al. | |
| 2008/0006089 A1 | 1/2008 | Adnan et al. | |
| 2008/0200865 A1 | 8/2008 | Bedingfield | |
| 2008/0283096 A1 | 11/2008 | Scheringer et al. | |
| 2009/0007642 A1 | 1/2009 | Busby et al. | |
| 2009/0009290 A1 | 1/2009 | Kneip et al. | |
| 2009/0012450 A1 | 1/2009 | Shah et al. | |
| 2009/0012452 A1 | 1/2009 | Slepicka et al. | |
| 2009/0012457 A1 | 1/2009 | Childers et al. | |
| 2009/0101550 A1 | 4/2009 | Muller et al. | |
| 2009/0211975 A1 | 8/2009 | Brugger et al. | |
| 2009/0230043 A1 | 9/2009 | Heyes et al. | |
| 2010/0043694 A1 | 2/2010 | Patel | |
| 2010/0045471 A1 | 2/2010 | Meyers | |
| 2010/0089807 A1 | 4/2010 | Heyes et al. | |
| 2010/0139254 A1 | 6/2010 | Sebestyen et al. | |
| 2010/0263687 A1 | 10/2010 | Braun et al. | |
| 2010/0312174 A1* | 12/2010 | Hoffman | A61M 1/28 604/29 |
| 2011/0009797 A1 | 1/2011 | Kelly et al. | |
| 2011/0034850 A1 | 2/2011 | Jonsson | |
| 2011/0132838 A1 | 6/2011 | Curtis et al. | |
| 2011/0168614 A1 | 7/2011 | Pouchoulin et al. | |
| 2012/0164022 A1 | 6/2012 | Muginstein et al. | |
| 2012/0269907 A1 | 10/2012 | Coates | |
| 2012/0276549 A1 | 11/2012 | Cunningham et al. | |
| 2012/0292237 A1 | 11/2012 | Heyes et al. | |
| 2012/0308431 A1 | 12/2012 | Kotsos et al. | |
| 2013/0037465 A1 | 2/2013 | Heyes et al. | |
| 2013/0056419 A1 | 3/2013 | Curtis | |
| 2013/0153495 A1 | 6/2013 | Kelly et al. | |
| 2013/0199998 A1 | 8/2013 | Kelly et al. | |
| 2013/0274642 A1 | 10/2013 | Soykan et al. | |
| 2014/0224736 A1 | 8/2014 | Heide | |
| 2014/0251885 A1 | 9/2014 | Heyes | |
| 2014/0271106 A1 | 9/2014 | Alessandro et al. | |
| 2014/0299544 A1 | 10/2014 | Wilt et al. | |
| 2015/0027951 A1 | 1/2015 | Wallace et al. | |
| 2015/0076053 A1 | 3/2015 | Higgitt et al. | |
| 2015/0112119 A1 | 4/2015 | Buckberry | |
| 2015/0129481 A1 | 5/2015 | Higgitt et al. | |
| 2015/0132860 A1* | 5/2015 | Cook | F04B 49/106 436/501 |
| 2015/0238673 A1 | 8/2015 | Gerber et al. | |
| 2015/0258263 A1 | 9/2015 | Hogard | |
| 2015/0352269 A1 | 12/2015 | Gerber et al. | |
| 2015/0359954 A1 | 12/2015 | Gerber et al. | |
| 2016/0045656 A1 | 2/2016 | Buckberry | |
| 2016/0051743 A1 | 2/2016 | Buckberry | |
| 2016/0058933 A1 | 3/2016 | Ballantyne et al. | |
| 2016/0076535 A1 | 3/2016 | Clifton et al. | |
| 2016/0077644 A1 | 3/2016 | Ritter et al. | |
| 2017/0056576 A1 | 3/2017 | Doyle et al. | |
| 2017/0167983 A1 | 6/2017 | Klomp et al. | |
| 2017/0189598 A1* | 7/2017 | Slade | B01D 24/40 |
| 2017/0252498 A1 | 9/2017 | Heyes et al. | |
| 2017/0290970 A1* | 10/2017 | Friederichs | A61M 1/155 |
| 2017/0296730 A1* | 10/2017 | Soto | A61M 1/1668 |
| 2018/0133391 A1 | 5/2018 | Heyes et al. | |
| 2018/0154059 A1 | 6/2018 | Heyes et al. | |
| 2018/0193545 A1 | 7/2018 | Crnkovich et al. | |
| 2018/0344915 A1 | 12/2018 | Wallace | |
| 2019/0001042 A1 | 1/2019 | Buckberry | |
| 2019/0015577 A1 | 1/2019 | Garrido et al. | |
| 2019/0024654 A1 | 1/2019 | May et al. | |
| 2019/0358381 A1 | 11/2019 | Westenbrink | |
| 2019/0374698 A1 | 12/2019 | Buckberry et al. | |
| 2019/0376504 A1 | 12/2019 | Westenbrink | |
| 2019/0385434 A1 | 12/2019 | Yuds et al. | |
| 2020/0030515 A1 | 1/2020 | Merchant | |
| 2020/0075159 A1 | 3/2020 | Bardorz et al. | |
| 2020/0268958 A1 | 8/2020 | Heyes et al. | |
| 2020/0276372 A1 | 9/2020 | Milad et al. | |
| 2020/0330671 A1 | 10/2020 | Buckberry et al. | |
| 2022/0001087 A1 | 1/2022 | Heyes et al. | |
| 2022/0160943 A9 | 5/2022 | Buckberry et al. | |
| 2022/0241480 A1 | 8/2022 | Fincham | |
| 2022/0241573 A1 | 8/2022 | Fincham | |

FOREIGN PATENT DOCUMENTS

| | | |
|---|---|---|
| EM | 0043757640001 | 10/2017 |
| EM | 0043757640002 | 10/2017 |
| EM | 0079551250002 | 6/2020 |
| EP | 0165751 A2 | 12/1985 |
| EP | 0754468 A2 | 1/1997 |
| EP | 2219703 | 8/2010 |
| EP | 2955512 A1 | 12/2015 |
| FR | 2310136 A1 | 12/1976 |
| GB | 90079551250001 | 5/2020 |
| GB | 90079551250002 | 5/2020 |
| JP | H04266740 | 9/1992 |
| JP | H06261872 | 9/1994 |
| JP | H07174659 A | 7/1995 |
| JP | 2000/130334 | 5/2000 |
| JP | 1645323 S | 11/2020 |
| WO | WO 81/01800 | 7/1981 |
| WO | WO-9100113 A2 | 1/1991 |
| WO | WO-9116542 A1 | 10/1991 |
| WO | WO 95/06205 | 3/1995 |
| WO | WO 95/25893 | 9/1995 |
| WO | WO-9625214 A1 | 8/1996 |
| WO | WO-9710013 A1 | 3/1997 |
| WO | WO-9728368 A2 | 8/1997 |
| WO | WO-9929356 A1 | 6/1999 |
| WO | WO 2000/006217 | 2/2000 |
| WO | WO-0057935 A1 | 10/2000 |
| WO | WO-02066833 A1 | 8/2002 |
| WO | WO-02081917 A1 | 10/2002 |
| WO | WO 2003/101510 | 12/2003 |
| WO | WO-2005044339 A2 | 5/2005 |
| WO | WO-2005080794 A1 | 9/2005 |
| WO | WO 2006/120415 | 11/2006 |
| WO | WO 2006/120417 | 11/2006 |
| WO | WO-2008100671 A1 | 8/2008 |
| WO | WO-2008106191 A2 | 9/2008 |
| WO | WO-2008135245 A1 | 11/2008 |
| WO | WO-2009006489 A2 | 1/2009 |
| WO | WO-2009024333 A1 | 2/2009 |
| WO | WO-2009038834 A1 | 3/2009 |
| WO | WO 2009/061608 | 5/2009 |
| WO | WO-2009127624 A2 | 10/2009 |
| WO | WO-2010089130 A1 | 8/2010 |
| WO | WO-2010146343 A2 | 12/2010 |
| WO | WO-2011027118 A1 | 3/2011 |

(56) References Cited

FOREIGN PATENT DOCUMENTS

| | | |
|---|---|---|
| WO | WO-2011068885 A1 | 6/2011 |
| WO | WO-2011105697 A2 | 9/2011 |
| WO | WO-2011105698 A2 | 9/2011 |
| WO | WO 2013/057109 | 4/2013 |
| WO | WO-2013052680 A2 | 4/2013 |
| WO | WO 2013/110906 | 8/2013 |
| WO | WO 2013/110919 | 8/2013 |
| WO | WO 2013/114063 | 8/2013 |
| WO | WO 2013/121162 | 8/2013 |
| WO | WO-2013121163 A1 | 8/2013 |
| WO | WO 2014/072195 | 5/2014 |
| WO | WO-2014082855 A1 | 6/2014 |
| WO | WO 2014/155121 | 10/2014 |
| WO | WO 2015/007596 | 1/2015 |
| WO | WO 2015/022537 | 2/2015 |
| WO | WO 2016/016870 | 2/2016 |
| WO | WO-2017137723 A1 | 8/2017 |
| WO | WO-2018115816 A1 | 6/2018 |

OTHER PUBLICATIONS

Search Report prepared for Application No. GB1705273.9, dated Sep. 4, 2017.

He et al., "A Fluorescent Sensor with High Selectivity and Sensitivity for Potassium in Water," Journal of the American Chemical Society 2003 125 (6), 1468-1469.

Kivi, Air Embolism, Healthline, Aug. 20, 2012, p. 1-5.

Ergo-Express Motorized Dialysis Cart, Aug. 14, 2017, youtube.com [online], [site visited Jan. 9, 2022], Available from internet, URL: https://www.youtube.com/watch?v=j4rAXthOmbY (Year: 2017).

Home Dialysis Tescon Aqua Tech, Aug. 1, 2020, youtube.com [online], [site visited Jan. 9, 2022], Available from internet, URL: https://www.youtube.com/watch?v=WLLPZoS_mz4 (Year: 2020).

LHO2028 Portable Hemodialysis Machine, date unknown, aliexpress.com [online], [site visited Jan. 4, 2022], Available from internet: https://www.aliexpress.com/item/1005003324875329.html?randl_currency=USD&_randl_shipto=US&src=google&afffcid=1003bab3b8db4e93b9ba88522a14cfc1-1641319351626-05232-UneMJZVf&aff_fsk=UneMJZVf&aff_platform=aaf&sk=UneMJZVf&aff_trace_key= (Year: 2022).

Medical Hemodialysis Machine, date unknown, aliexpress.com [online], [site visited Jan. 4, 2022], Available from internet: https://www.aliexpress.com/item/1005003445721549.html?_randl_currency=USD&_randl_shipto=US&src=google&aff_f cid=a524f3f9cd9b4976b6b47962f3439d62-1641319166409-02691-UneMJZVf&aff_fsk=UneMJZVf&aff_platform=aaf&sk=UneMJZVf&aff_trace_key=a524f3f9cd9b4976b6b47962f3439d62-1641319166409-02691-UneMJZVf&terminal_id=d0c2cca4b7664d128cb4801a9ef03ff2 (Year: 2022).

Millenium HX Portable Dialysis Water System, Jul. 2, 2014, youtube.com [online], [site visited Jan. 10, 2022], Available from internet, URL: https://www.youtube.com/watch?v=IGEbPi2CDsw (Year: 2014).

Portable home dialysis device, Nov. 2, 2017, med-technews.com [online], [site visited Jan. 4, 2022], Available from internet: https://www.med-technews.com/news/portable-home-dialysis-device-to-launch-next-year/ (Year: 2017).

European Patent Office, "International Preliminary Report on Patentability," issued in related International Patent Application No. PCT/GB2018/050797 dated Oct. 1, 2019 (7 pages).

\* cited by examiner

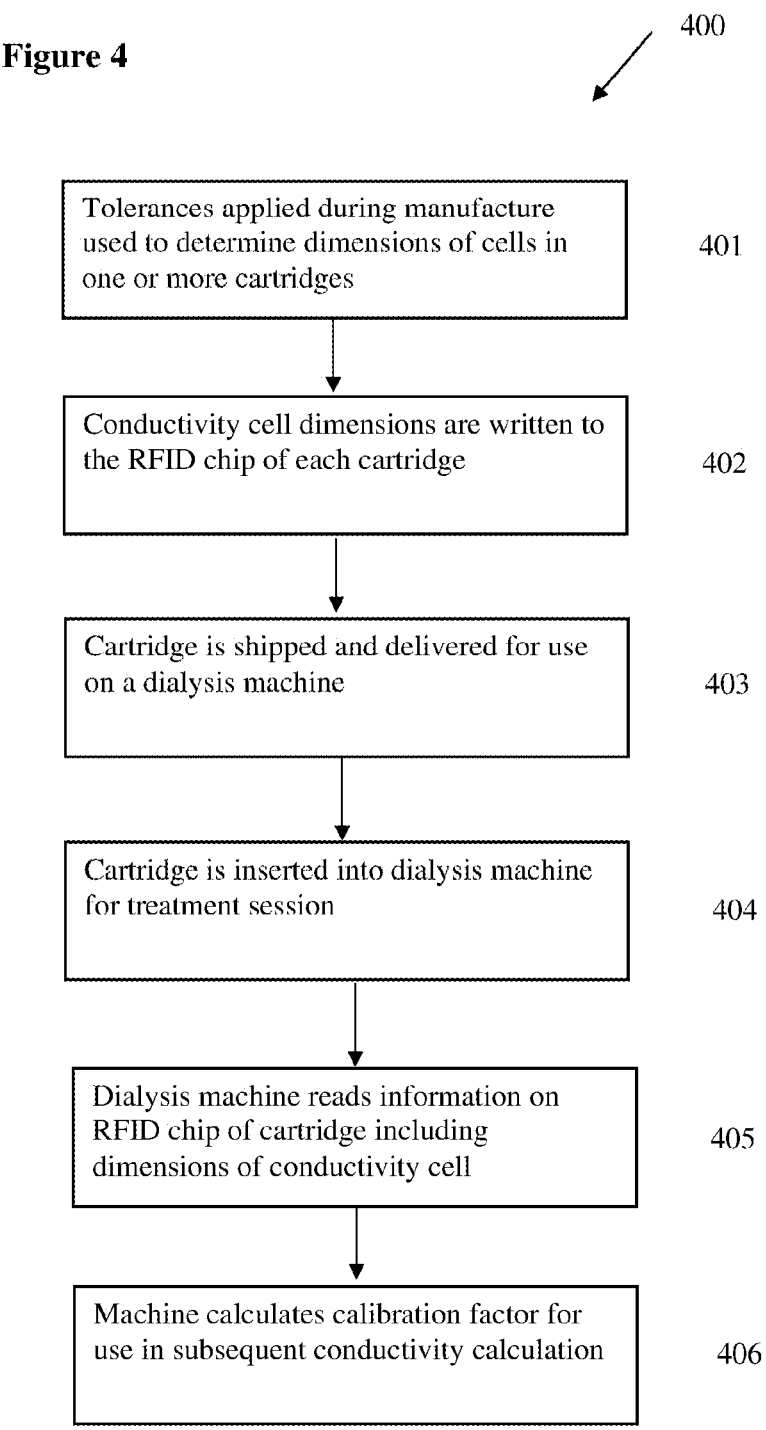

DIALYSIS CASSETTE WITH RFID CHIP

This application is a National Stage Entry and is entitled to and hereby claims priority under 35 U.S.C. §§ 365 and 371 to corresponding PCT Application No. PCT/GB2018/050797, filed Mar. 27, 2018 entitled "Dialysis Cassette With RFID Chip", which in turn claims priority to G.B. Patent Application No.: 1705273.9, filed Mar. 31, 2017, entitled the same. The disclosures of the above applications are incorporated herein by reference in their entireties.

FIELD OF THE INVENTION

The present invention relates to the storage of data on a component of a medical device and exchange of data between the component and the medical device. More particularly, the invention relates to the exchange of data stored on a cartridge for use in a dialysis machine.

BACKGROUND OF THE INVENTION

Haemodialysis is a blood filtration treatment performed on a patient with impaired renal function. A dialysis machine is connected to a patient's blood flow and the removes harmful waste substances from the blood before the blood is pumped back into the patient. Operation of the dialysis machine utilises a cartridge, whose function is to prepare dialysate (cleaning) solution and to balance flow of the dialysate. To do this, the cartridge comprises a complex arrangement of valves, membranes and fluid cavities. It is known in the art to provide disposable, single-use cartridges which eliminate the inherent hygiene issues associated with cleaning non-disposable cartridges.

It will be appreciated that, for proper dialysis machine operation and function, and, by extension, improved patient experience, it is imperative that the cartridge complies with various manufacturing, storage, and usage standards and requirements and that certain parameters of the cartridge fall within permissible limits, values and/or variations. Current dialysis systems do not allow for the capture or analysis of characteristics which facilitate the determination of whether such standards and tolerances are met. Moreover, current dialysis systems have inherent limitations which mean that they are unable to efficiently accommodate variations in parameters of the cartridge, where such variations are a result of the manufacturing process.

It is an aim of the present invention to mitigate at least some of the above-mentioned drawbacks.

SUMMARY OF THE INVENTION

Accordingly, a first aspect of the invention provides a fluidic cartridge for use with a dialysis machine, the cartridge comprising a data storage unit for storing data in a readable, writable and non-volatile manner, wherein the data storage unit stores data relating to one or more physical properties of the cartridge which are a result of the tolerances applied during manufacture of the cartridge.

The fluidic cartridge facilitates the storage of information relating to the cartridge which can be read by a dialysis machine and/or a separate data reader. By allowing the dialysis machine to adjust its operation based on data received from the cartridge, variations in cartridge parameters can be compensated for by the machine, and manufacturing tolerances for the cartridge can be relaxed accordingly, which in turn means that the cost of manufacturing the cartridges can be reduced.

The data storage unit may be an RFID chip.

The data storage unit may be readable and preferably writable by a dialysis machine.

The data may include information relating to any one or more of the age of the cartridge, the intended function of the cartridge, the intended operation of the cartridge, the person or persons for whom the cartridge is to be used, the extent of usage of the cartridge, the intended geographical usage of the cartridge, the software intended for or required for use with the cartridge, the origin of the cartridge, sterilisation of the cartridge and storage and transportation of the cartridge.

According to a second aspect of the invention, there is provided a method of manufacture of a fluidic cartridge for use with a dialysis machine, the method comprising providing a cartridge, securing a data storage unit on to the cartridge and writing, to the data storage unit, information relating to one or more physical properties of the cartridge which are a result of tolerances applied during manufacture of the cartridge.

The fluidic cartridge according to the first aspect of the invention may be manufactured according to the second aspect of the invention.

According to a third aspect of the invention, there is provided a dialysis machine comprising an interface for receiving a fluidic cartridge according to the first aspect of the invention, data reading means for reading data stored on a data storage unit on a fluidic cartridge, and a processor for receiving data stored on the data storage unit of the fluidic cartridge, wherein the processor comprises executable instructions, wherein the executable instructions comprise instructions for adjusting an operational parameter of the dialysis machine based on the received data.

The dialysis machine is able to extract data from a cartridge and send the data to a central storage facility for analysis. The quality, use and authenticity, at least, of the cartridge can be monitored in this way.

An operational parameter may comprise a conductivity cell calibration factor.

The executable instructions may further comprise instructions for calculating the conductivity of dialysate solution in a conductivity cell of the cartridge based on the conductivity cell calibration factor.

The dialysis machine may further comprise transmitting means for transmitting data read by the data reading means to a remote storage facility.

According to a fourth aspect of the invention, there is provided a method of operating a dialysis machine, comprising the steps: providing a dialysis machine comprising means for reading data stored on a data storage facility of a dialysis cartridge, providing a dialysis cartridge for use with the dialysis machine, wherein the cartridge comprises a data storage facility storing data relating to physical parameters of the cartridge which are a result of tolerances applied during manufacture of the cartridge, reading, by the dialysis machine, information stored on the cartridge, calculating, by the dialysis machine, a calibration factor based on the information read from the data storage facility of the cartridge.

The method may further comprise calculating, by the dialysis machine, the conductivity of dialysate in a conductivity cell of the cartridge based on the calculated calibration factor.

According to a fifth aspect of the invention, there is provided a cartridge for use in a portable dialysis machine, wherein the cartridge comprises data storage means for storing data, wherein the data storage means stores data relating to sterilisation of the cartridge, and wherein the data storage means is configured such that when the cartridge is connected to the dialysis machine, data stored on the data storage means is read by the dialysis machine.

The stored data may comprise information relating to whether the cartridge has been sterilised since it was last used.

The data storage means may be at least one of an optical pattern, physical pattern, RFID chip or RFID tag.

The data storage means may be configured to be written to by the dialysis machine.

The data on the data storage means data may be be read and written to by a device other than a dialysis machine.

The data stored on the data storage means may further include information relating to any one or more of the age of the cartridge, the intended function of the cartridge, the intended operation of the cartridge, the person or persons for whom the cartridge is to be used, the extent of usage of the cartridge, the intended geographical usage of the cartridge, the software intended for or required for use with the cartridge, the origin of the cartridge, sterilisation of the cartridge and storage and transportation of the cartridge.

According to a sixth aspect of the invention, there is provided a portable dialysis machine, the machine comprising data reading means for reading data stored on data storage means of a cartridge when the cartridge is loaded in the machine, a processor, wherein the processor is configured to receive the data from the data reading means and to determine, from the stored data, whether the cartridge is suitable for use with the machine, wherein the processor is further configured to output information to be displayed on a user interface of the machine, wherein the output information relates to the determination as to whether the cartridge is suitable for use by the machine.

The machine may further comprise data writing means for writing data to a data storage means of a cartridge when the cartridge is loaded in the machine.

The data writing means may be configured to write data relating to the usage of the cartridge after the cartridge has been used.

The dialysis machine may further comprise transmitting means for transmitting data read by the data reading means to a remote storage facility.

International Patent Publication No. WO2015/022537 describes a blood treatment device capable of delivering haemodialysis and/or haemodiafiltration treatments to a patient. The device includes a cartridge on which dialysate for use in either treatment is mixed. A detailed description of the operation of the machine is set out at paragraphs [0068] to [0140] with reference to the accompanying figures. The contents of that description are hereby incorporated by reference thereto. The description of the device in WO2015/022537 sets out that a cartridge of the type described herein is received in the device to effect mixing of dialysate ingredients into mixed dialysate and to supply the mixed dialysate to a dialyser cartridge in accordance with a specific treatment mode.

WO2015/022537 describes that the control system 500 activates the valves and pumps on the device/cartridge to effect different treatment modes, particularly haemodialysis (described at paragraphs [0120] to [0123]) and different haemodiafiltration modes (described at paragraphs [0124] to [0139].

Presently, the control system 500 on the device requires intervention by a medical practitioner to operate a particular treatment protocol. For example, the device allows a user manually to initiate one of the treatment modes. It also allows the user to program the device to operate the machine in a first treatment mode for a first period and a second treatment mode for a second period.

According to a seventh aspect of the invention, there is provided a fluidic cartridge for use in a dialysis machine, wherein the cartridge comprises a data storage unit for storing data, wherein the data storage unit stores data relating to a patient treatment protocol.

In that way a specific patient treatment protocol can be loaded onto the cartridge and when the cartridge is installed in the device, the control system 500 reads the treatment protocol and operates the device accordingly, removing the need to program the device with the treatment protocol.

The patient treatment protocol data may include one or more of length of treatment, treatment modes to be performed by the machine, the length of time such modes are performed, the number of times such modes are performed and the frequency thereof.

According to an eighth aspect of the invention, there is provided a dialysis machine comprising data reading means for reading data stored on the data storage unit of the fluidic cartridge of the seventh aspect when the cartridge is loaded in the machine, and a processor, wherein the processor is configured to receive the patient treatment protocol data read from the data storage unit by the data reading means and to operate the machine to deliver the patient treatment protocol.

BRIEF DESCRIPTION OF THE FIGURES

Embodiments of the present invention will now be described, by way of example only, and with references to the accompanying drawings, in which:

FIG. 4 is a flow diagram of a method of data storage and transfer according to an embodiment of the invention.

DETAILED DESCRIPTION

A dialysis system generally comprises a dialyser which receives blood which is pumped by a peristaltic pump from a patient via an arterial line. The dialyser comprises a semi permeable membrane which separates the blood from dialysate solution, which removes impurities from the blood. Cleaned blood is returned to the patient via a venous line. Clean dialysate solution is pumped into the dialyser and spent, unclean dialysate solution is removed from the dialyser. A known portable dialysis system utilises a cartridge to mix clean dialysate solution and deliver it, at an appropriate flow rate, to the dialyser.

Figure 1:
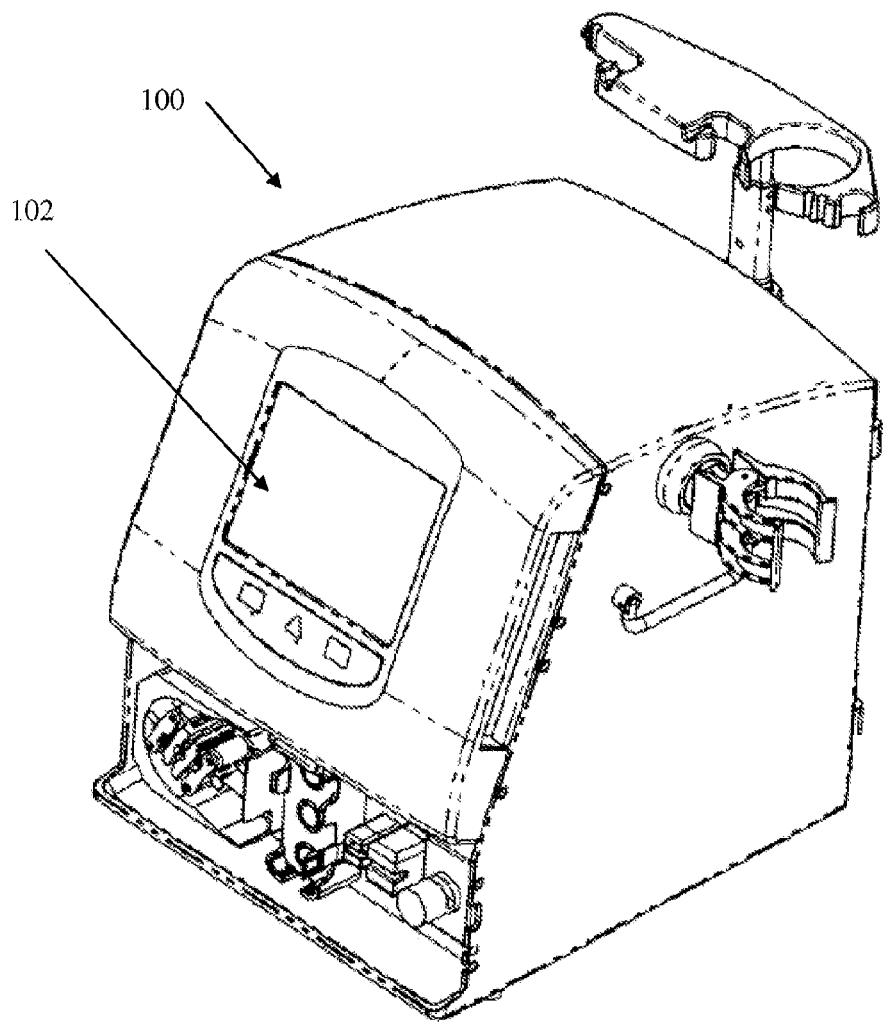
FIG. 1 is a perspective view of a portable haemodialysis machine.

According to an embodiment of the invention, the function of the dialysis system described above is performed by a portable dialysis machine 100 as shown generally in FIG. 1. This machine is substantially the same as that described in WO2015/022537 with the additional features described below. Connections to a patient are not shown for clarity. User interface 102 on the front panel of machine 100 allows a patient and/or caregiver to interact with machine 100 and input information (such as treatment session parameters, instructions relating to cleaning and maintenance etc.) and to view information output by machine 100 (such as diagnostics, help and troubleshooting instructions, treatment session data, etc.).

Figure 2:
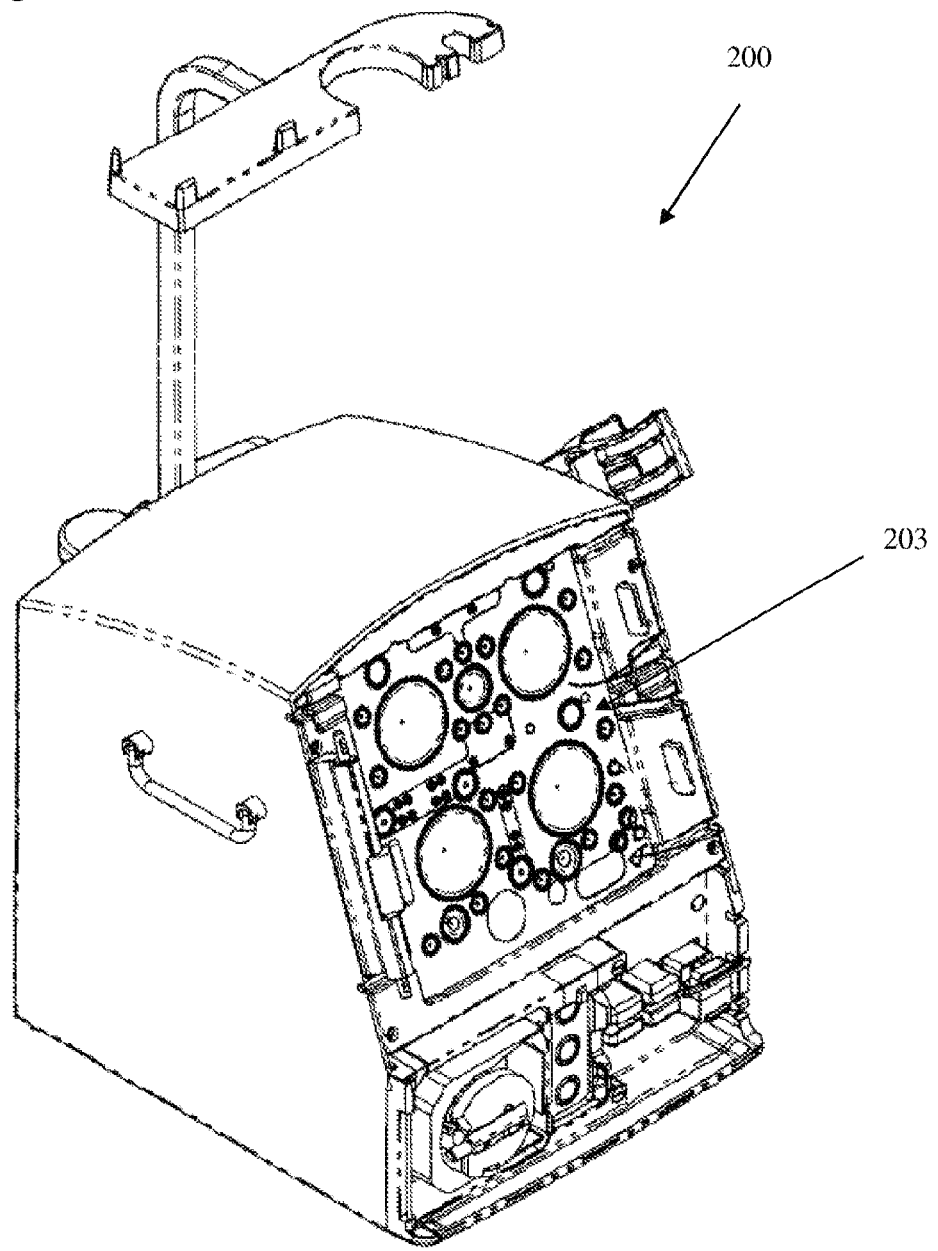
FIG. 2 is a perspective view of a portable haemodialysis machine.
Figure 3:
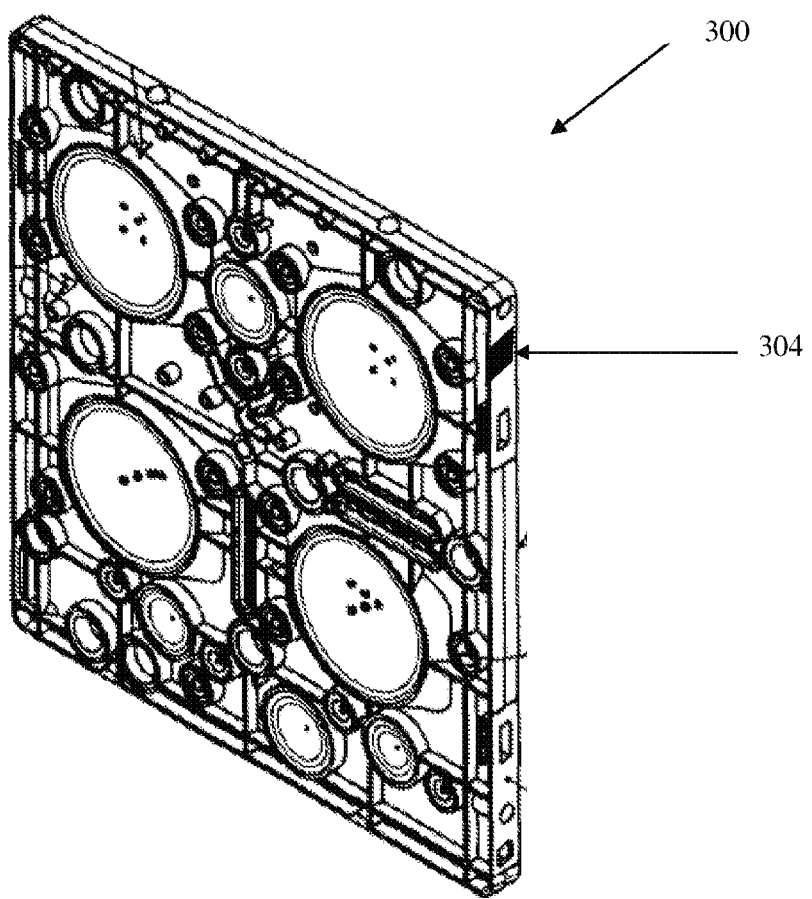
FIG. 3 is a perspective view of a disposable cartridge according to an embodiment of the present invention.

FIG. 2 shows dialysis machine 200 without the front panel and FIG. 3 shows a disposable cartridge 300 which is configured to fit within machine 200 adjacent to interface 203 of machine 200. Cartridge 300 is typically made from medical grade acrylic plastic and has a machine side and a patient side. Machine side is configured to lie adjacent to interface 203 of machine 200. Cartridge 300 comprises a complex arrangement of pump chambers, valves and fluid passageways. The pump chambers are sealed by diaphragms which are typically formed from DEHP-free PVC and preferably all diaphragms are provided by a continuous sheet of material on machine side of cartridge 300. Individual diaphragms are operable by the application pneumatic pressure supplied by corresponding valves of interface 203 of machine 100, as described further in applicant's prior publication WO2015022537.

In one embodiment, a passive RFID chip or tag 304 is securely fixed to cartridge 300 during manufacture. Various data is written to chip 304 before cartridge 300 is sealed in packaging. The data is written to chip 304 using techniques that are known in the art. In other embodiments, data is stored on cartridge 300 by other means known in the art, such as by optical pattern, e.g. barcode or QR code. Alternatively (or additionally) a physical barcode is integrated on an area of the cartridge by injection moulding. A moveable dongle or tab may also be adopted, as well as pins whose electrical connections convey various information. In one embodiment, machine 100 comprises a RFID reader which reads information stored on passive RFID chip 201 of cartridge 200. Dialysis machine 100 also comprises an RFID writing facility to write additional data to RFID chip 201.

The use of an authentic, certified, and appropriate cartridge is important for correct machine operation and improved patient experience. Accordingly, the storage of relevant data on a cartridge in accordance with the present invention allows a dialysis machine to verify, when the cartridge is inserted into the machine and before commencement of a treatment session, that the inserted cartridge has been manufactured by a trusted and authorised manufacturer, that it is of a type suitable for the intended operation of the machine (for example, treatment or cleaning) and that its condition has not been compromised by incorrect storage, amongst other things.

To avoid the use of counterfeit cartridges and ensure only authentic cartridges can be used by the dialysis machine, a unique locking code is written to each authentic cartridge. Every unique locking code is known by every dialysis machine and so when a cartridge is inserted into a dialysis machine, the machine is able to match (or otherwise) the cartridge's locking code with one stored on the machine. If the locking code stored on chip 304 and read by machine 200 cartridge is not recognised by the machine (or indeed if the cartridge does not store a unique locking code), operation of the machine with the cartridge is denied. In an alternative embodiment, use of a cartridge is denied if it does not comprise any data storage unit or facility which is readable by the dialysis machine.

Dialysis cartridges may be of different types, where each type is suitable for a different purpose. For example, treatment cartridges are suitable for use during dialysis treatment (and are generally referred to herein simply as a 'cartridge'). Cleaning cartridges are suitable for use during a cleaning operation of a dialysis machine. A cleaning cartridge allows the machine to be subjected to a hot water or a sterilizing solution (citric acid) throughflow for cleaning. Indicator holes are made in the cleaning cartridge depending on the type of cleaning enabled by the cartridge. These holes are sensed by the machine by means of two retractable sensor pins which pass through a hole or, in the absence of a hole, are depressed by the cleaning cartridge body. The absence of any holes corresponding to the sensor pins is indicative of a proper dialysis cartridge.

Furthermore, particular cartridges are intended for use in specific models and makes of dialysis machines and are manufactured accordingly. Use of cartridges which are not intended for use on particular machines (and therefore may not have undergone strict testing and adherence to certain regulations) may therefore cause damage to the dialysis machine, impaired operation and ultimately compromise patient experience. To address this, data verifying the authenticity of a cartridge can be written to chip 201 during or after manufacture so that machine 100 can determine that the inserted cartridge 200 is suitable for use with the type, model and specification of machine 100 and that the cartridge has been manufactured at an authorised source and/or according to other predetermined criteria.

It is possible to reuse dialysate solution by cleaning it using sorbent. Dialysate which has been cleaned in this way does not require the addition of as many electrolytes to be usable again. As such, some parts of a cartridge (which mixes the dialysate during treatment) are redundant is cleaned dialysate is used. The suitability of a cartridge for such operation can be stored on the cartridge's chip.

In accordance with the above, information which is written to chip 304 before, during or after manufacture includes the cartridge's age/date of manufacture, batch number, intended function (i.e. travel mode, hemodiafiltration (HDF), for use with recycled dialysate), intended operation (i.e. whether it is intended for a specific type of operation, e.g. valve sequencing), whether it is intended for a particular patient or class of patients, its maximum usage duration (for example, maximum number of hours it can be used for, which may be based on the particular method of sterilisation of the cartridge), whether it has been sterilised and by what method it has been sterilised (e.g. gamma sterilisation, ethylene oxide, e-beam), whether it is intended for use in a particular geographical area (e.g. UK or US, where different countries or geographical areas stipulate different manufacturing standards, etc.), the cartridge's usage expiry date, and whether a dialysis in which the cartridge is used requires a software update for proper functioning with the particular cartridge.

It is known to record information relating to storage conditions, origin, specification, etc. on labels on the packaging of cartridges. When the cartridge is first used, however, the packaging is usually discarded and therefore the information on the label cannot be read usefully at a later date. Advantageously, the use of RFID chips on the cartridge to store data means that data is readable throughout the life of the cartridge and data can be written to the cartridge during its life. During transportation to its intended final destination, a cartridge may pass through a number of countries, ports, warehouses, and modes of transportation. At various stages during transportation, data is written to RFID chips of cartridges, by RFID writers located, for example, in storage locations or in transportation, specifying the date and time the cartridge entered and left the storage location or transport, any particular treatment is was subjected to (e.g. additional sterilisation) and the conditions it has been stored or transported under (e.g. temperature, humidity, UV level, pressure). Prolonged exposure to daylight may, for example, increase the risk of perishing of parts of the cartridge (even if sealed) and consequently knowledge of the duration of daylight exposure allows the machine 100

(or indeed another RFID reader) to determine whether the cartridge is fit for use. Associated risks may also apply to storage at temperatures outside of a predefined temperature range (which may cause rupturing of membranes), to storage at pressures outside of a predefined pressure range and to storage outside of a predefined humidity range.

Most cartridges are 'disposable', i.e. they are manufactured as safe to use for a single dialysis session (i.e. they have a maximum usage duration). However, under certain conditions, they can be re-used provided the maximum usage duration has not been exceeded. For example, a particular patient may use a particular cartridge for a dialysis session lasting 2 hours. The maximum usage duration of the cartridge is 4 hours. It is possible for the same cartridge to be re-used by the same patient for the remaining two hours, in the same or a different dialysis machine. Once the initial 2 hour dialysis session is complete (but before cartridge 300 is removed from dialysis machine 100), dialysis machine 100 writes to chip 304 of cartridge 300 the number of hours and minutes of usage, i.e. the amount of time for which the cartridge has been used. When the cartridge is inserted into a different dialysis machine (or when machine 100 is instructed to start a new dialysis session using the same cartridge 300) the dialysis machine is able to read, from chip 304, the maximum usage duration of cartridge 300 and the current duration of usage (in this case, two hours). In this way the machine is able to determine how long the cartridge can be used for before its maximum usage duration is reached and therefore whether or not the cartridge can be used for the intended dialysis session.

In addition, machine 100, after completion of the initial dialysis session, writes data to the cartridge to identify the particular person it has been used for. This data may take the form of a unique number, and allows the same or a different dialysis machine to verify, based on the separate entry of the unique number, that the cartridge 'matches' the patient who intends to use it for a subsequent dialysis session.

In some instances, it is desirable for cartridges to be re-used (within their maximum usage duration) for a person other than the person who first used the cartridge. As will be appreciated, for a cartridge to be reused in this way safely, the cartridge requires sterilisation. In this case, data confirming (or otherwise) that the cartridge has undergone sterilisation is written to chip 201 once disinfection and sterilisation is complete and such data is read by a dialysis machine (where appropriate, in conjunction with data relating to the previous user) such that the machine can determine whether or not the cartridge has been appropriately sterilised and is suitable for re-use.

Some or all of the information stored on all or a sample of cartridges during a specified time period is transmitted from a dialysis machine to a central server to facilitate monitoring of and data collection relating to cartridge usage. In one embodiment, each dialysis machine is configured to periodically send data relating to cartridge use and conditions to a central server via wired or wireless internet connection.

A main function of a cartridge (such as a cartridge discussed above) is to prepare dialysate and balance flow of the dialysate. Dialysate is a sterilized solution of mineral ions in an acid buffer and a bicarbonate buffer mixed with sterilized water. The required composition of the dialysate differs between patients and it is of critical importance that the composition for a particular patient is accurate to within clinical tolerances. It is the job of the dialysis machine, programmed correctly, to instruct the mixing of the dialysate within the cartridge according to the requirements of a particular patient.

The composition of dialysate can be determined to a high degree of accuracy by measuring the conductivity of the dialysate solution. Conductivity is determined by measuring the electrical current, and is variable dependent on the concentration of ions of sodium chloride in the dialysate solution. A cavity, or cell, of the cartridge receives mixed dialysate before it is passed on to the dialyser. Conductivity of the dialysate in the cell is typically determined using sensing pins, as is known in the art. To accurately measure conductivity, the cross sectional area of the cell and the distance between the pins must be known.

In a further embodiment, the RFID chip 304 is programmed with data relating to a patient treatment protocol. When installed into the machine 200, the RFID reader reads the patient treatment protocol data and passes that data to a control processor on the machine 200. The control processor then operates the machine 200 to deliver the patient treatment protocol. The patient treatment protocol data may be the length of time that the machine delivers dialysis treatment. It may relate to delivery of one or more specific treatment modes including the length of time each mode is delivered and the order in which each mode is delivered. The data may be an executable instruction which the processor executes to control the machine.

Currently, both cartridge (including the volumes of the dialysate cells) and machine components are manufactured to very high specifications. For example, in order for an exact amount of dialysate to be pumped during a dialysis session of a specified duration, the size of each cavity of a cartridge is specified to a high degree of accuracy to ensure that operation of the dialysis machine, and ultimately, patient experience, is achieved. Tolerances are the permissible limits or the permissible variation in limits that are applied to parameters of the cartridge when it is manufactured. As an example, it may be specified that a fluid cell or cavity of the cartridge has nominal (i.e. and intended and precise) values for dimensions (e.g. height and width). The manufacturing process, however, means that, in reality, the dimensions of the cell/cavity have an error value (i.e. tolerance) either above or below (or both above and below) the nominal values. In order to ensure treatment or operational parameters which rely on the dimensions of the cell/cavity are calculated to a high degree of accuracy, the tolerances resulting from the manufacturing process are currently made as high as possible (i.e. the error values are as small as possible).

However, cartridges 200 are manufactured in massively larger quantities than the dialysis machines 100 themselves due to the disposable nature of the cartridges. Manufacturing such a large quantity of cartridge 200 to within such high tolerances can slow down manufacture lead times and drive up manufacturing costs. Any variation between what is expected, by the machine, as the cell cross-section (based on specified nominal values of width and height), and the actual cell cross section (which differs from the nominal value as a result of random errors inherent in the manufacturing process) is typically input manually to the machine by a user of the machine. The packaging of each cartridge may comprise printed information detailing the actual measured parameters and dimensions of various cartridge parts and components and this information is manually input when the cartridge is loaded into the dialysis machine. The dialysis machine then makes the necessary calibration calculations accordingly. Manual input, however, is inherently error-prone and time consuming.

Advantageously, it has been realised by the inventors of present invention that drawbacks relating to the need for high tolerances for manufacture of cartridges and risk of false entry of critical cartridge parameters can be mitigated by storing actual dimensions (which deviate from the nomical values as a result of manufacturing tolerances) for a particular cartridge or batch of cartridges onto a data storage facility located on the cartridge itself, such as a passive RFID chip as discussed above. When the cartridge is loaded into a machine but before dialysis is begun, the machine 100 reads the actual dimension and parameter data for the particular cartridge. The machine is then able to adjust one or more operational parameters accordingly (for example, by increasing the duration of the dialysis session if the machine determines that one of the cavities of cartridge has a volume which is 1 $mm^3$ smaller than expected than the specified nominal value). By allowing for the machine to compensate for deviations in cartridge parameters as a result of manufacturing tolerances, rather than applying very high tolerances during manufacture, the cartridge can be manufactured more quickly and cheaply.

FIG. 4 provides an overview of a process 400 of adjusting treatment parameters based on critical conductivity cell parameters of the cartridge. At step 401, the tolerances that are applied during manufacture are used to determine the dimensions of conductivity cells of one or more cartridges. These dimensions are written to an RFID chip located on each cartridge at step 402, by means known in the art. Each cartridge is sealed in packaging before being shipped and eventually delivered at its final destination at step 403. At steps 404 and 405, a cartridge is inserted into a dialysis machine and an RFID reader of the dialysis machine reads the conductivity cell dimensions, along with any other information (as discussed above) on the cartridge's RFID chip. In an alternative embodiment, the RFID chip stores one or more tolerances (for example, a pair of tolerances (upper and lower) for one or more physical dimensions of the cartridge, such as conductivity cell dimensions, and the dialysis machine determines the dimensions of the conductivity cell to be used in a subsequent calibration calculation). At step 406, a processor of the dialysis machine calculated a calibration factor which will be required for subsequent determination of the conductivity of the dialysate solution.

The invention claimed is:

1. A fluidic cartridge for use with a dialysis machine, the fluidic cartridge comprising:
    a readable, writable, and non-volatile data storage unit storing data for use by the dialysis machine,
    wherein the data stored on the readable, writable, and non-volatile data storage unit includes one or more actual size dimension values of conductivity cells of the fluidic cartridge including deviations from nominal values of the one or more actual size dimension values of the conductivity cell of the fluidic cartridge as a result of manufacturing tolerances applied during manufacture of the fluidic cartridge, the data stored on the readable, writable, and non-volatile data storage unit identifies dialysate composition requirements for a particular patient,
    wherein the one or more actual size dimension values correspond to actual cross-sectional area of the conductivity cell, the conductivity of dialysate solution in the conductivity cell is measurable using the actual cross-sectional area of the conductivity cell and is comparable to the identified dialysate composition requirements for the particular patient.

2. The fluidic cartridge of claim 1, wherein the readable, writable, and non-volatile data storage unit is at least one of an RFID chip, an optical pattern, and a physical pattern, and/or the data storage unit is configured to be at least one of readable and writable by the dialysis machine.

3. The fluidic cartridge of claim 1, wherein the readable, writable, and non-volatile data storage unit is configured to be readable and writable by the dialysis machine.

4. The fluidic cartridge of claim 1, wherein the readable, writable, and non-volatile data storage unit is configured to be written to and/or readable by a dialysis system.

5. The fluidic cartridge of claim 1, wherein the data stored on the readable, writable, and non-volatile data storage unit further relates to at least one of:
    (a) verification that the fluidic cartridge is suitable for use with a particular dialysis machine including an intended function of the fluidic cartridge with the dialysis machine comprising one or more of a travel mode or recycled dialysate,
    (b) sterilization of the fluidic cartridge,
    (c) the origin of the fluidic cartridge, and
    (d) verification that the fluidic cartridge is suitable for use with a particular dialysis machine including an intended function of the fluidic cartridge with the dialysis machine wherein the intended function comprises hemodiafiltration.

6. The fluidic cartridge of claim 5, wherein the data related to sterilization of the fluidic cartridge corresponds to data relating to whether the fluidic cartridge has been sterilized since it was last used.

7. The fluidic cartridge of claim 5, wherein the data stored on the readable, writable, and non-volatile data storage unit related to sterilization of the fluidic cartridge corresponds to data relating to a type of sterilization used to sterilize the fluidic cartridge.

8. The fluidic cartridge of claim 1, wherein the data stored on the readable, writable, and non-volatile data storage unit further relates to whether the fluidic cartridge is suitable for use with reused and cleaned dialysate.

9. The fluidic cartridge of claim 1, wherein the data stored on the readable, writable, and non-volatile data storage unit is related to patient identifying information of a patient who has previously used the fluidic cartridge.

10. The fluidic cartridge of claim 1, wherein the data stored on the readable, writable, and non-volatile data storage unit further relates to at least one of an extent of maximum usage duration of the fluidic cartridge or age of the fluidic cartridge.

11. The fluidic cartridge of claim 1, wherein the data stored on the readable, writable, and non-volatile data storage unit further relates to transportation of the fluidic cartridge.

12. The fluidic cartridge of claim 1, wherein the data stored on the readable, writable, and non-volatile data storage unit further includes software intended for use with the fluidic cartridge.

13. The fluidic cartridge of claim 1, wherein the data stored on the readable, writable, and non-volatile data storage unit further relates to an intended geographical usage of the fluidic cartridge.

14. The fluidic cartridge of claim 1, wherein the data stored on the readable, writable, and non-volatile data storage unit further relates to a patient treatment protocol.

15. The fluidic cartridge of claim 1, wherein the data stored on the readable, writable, and non-volatile data storage unit further includes a unique locking code.

16. The fluidic cartridge of claim 1, wherein the data stored on the readable, writable, and non-volatile data storage unit further includes temperature of storage of the fluidic cartridge.

17. The fluidic cartridge of claim 1, wherein the data stored on the readable, writable, and non-volatile data storage unit further includes humidity of storage of the fluidic cartridge.

18. The fluidic cartridge of claim 1, wherein the data stored on the readable, writable, and non-volatile data storage unit further includes UV level exposure of the fluidic cartridge.

19. The fluidic cartridge of claim 1, wherein the data stored on the readable, writable, and non-volatile data storage unit includes date and time information of storage and transport of the fluidic cartridge.

* * * * *